UNITED STATES PATENT OFFICE.

HEINRICH SPECKETER AND WILHELM HOFMANN, OF GRIESHEIM-ON-THE-MAIN, GERMANY, ASSIGNORS TO CHEMISCHE FABRIK GRIESHEIM-ELEKTRON, OF FRANKFORT-ON-THE-MAIN, GERMANY, A CORPORATION OF GERMANY.

MANUFACTURE OF ALKALI METALS.

1,034,320. Specification of Letters Patent. Patented July 30, 1912.

No Drawing. Application filed January 3, 1910. Serial No. 535,956.

*To all whom it may concern:*

Be it known that we, HEINRICH SPECKETER and WILHELM HOFMANN, subjects of the German Emperor, and residents of Griesheim-on-the-Main, Germany, have invented certain new and useful Improvements in the Manufacture of Alkali Metals, of which the following is a specification.

The present invention has for its object the manufacture of alkali metals and consists in causing calcium carbid to act on alkali sulfid at the distilling temperature of the alkali metal and then distilling off the alkali metal.

Examples.

I. About 30 kilograms of anhydrous sodium sulfid are mixed with 1½ times their weight of calcium carbid and the mixture is heated to a bright red heat, when the metallic sodium distils off and is collected in a receiver.

II. When potassium is to be produced 60 kilograms of anhydrous potassium sulfid and 50 kilograms of carbid are mixed. The reaction takes place in the aforesaid manner in accordance with the following equation:

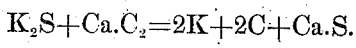

$$K_2S + Ca.C_2 = 2K + 2C + Ca.S.$$

Instead of employing the ready made alkali sulfid, the process may be carried out by reducing, by means of carbon, the corresponding sulfate, to the sulfid, and then introducing the carbid, the alkali metal distilling off.

We claim:

1. The herein described process of manufacturing alkali metals, which consists in heating a sulfid of the metal with the carbid of a metal which will combine with the sulfur, and distilling off the alkali metal.

2. The herein described process of manufacturing alkali metals which consists in heating a mixture of the carbid of an alkaline earth metal with a sulfid of an alkali metal at the distilling temperature of the alkali metal and distilling off the alkali metal.

3. The herein described process of manufacturing alkali metals, which consists in heating a sulfid of the metal with calcium carbid and distilling off the alkali metal.

In testimony whereof we have signed our names to this specification in the presence of two subscribing witnesses.

HEINRICH SPECKETER.
  WILHELM HOFMANN.

Witnesses for both applicants:
 FRANZ HASSLACHER,
 ERWIN DIPPEL.